United States Patent
Zikeli et al.

(10) Patent No.: US 11,187,338 B2
(45) Date of Patent: Nov. 30, 2021

(54) METHOD OF TRANSPORTING A VISCOUS FLUID THROUGH A HEAT EXCHANGER LINE

(71) Applicant: Aurotec GmbH, Regau (AT)

(72) Inventors: Stefan Zikeli, Regau (AT); Friedrich Ecker, Timelkam (AT)

(73) Assignee: AUROTEC GMBH, Regau (AT)

( * ) Notice: Subject to any disclaimer, the term of this patent is extended or adjusted under 35 U.S.C. 154(b) by 0 days.

(21) Appl. No.: 16/373,580

(22) Filed: Apr. 2, 2019

(65) Prior Publication Data

US 2019/0226594 A1    Jul. 25, 2019

Related U.S. Application Data

(62) Division of application No. 14/241,640, filed as application No. PCT/EP2012/067086 on Sep. 3, 2012, now abandoned.

(30) Foreign Application Priority Data

Sep. 2, 2011 (EP) .................................. 11179847
Nov. 29, 2011 (CN) ......................... 201120484015.1

(51) Int. Cl.
*F16K 17/16* (2006.01)
*F28F 7/02* (2006.01)
(Continued)

(52) U.S. Cl.
CPC ............ *F16K 17/162* (2013.01); *F16K 17/02* (2013.01); *F28F 7/02* (2013.01); *B01F 5/0619* (2013.01);
(Continued)

(58) Field of Classification Search
CPC ........... Y10T 137/1714; F16K 17/1613; F16K 17/14–1633
See application file for complete search history.

(56) References Cited

U.S. PATENT DOCUMENTS 3,684,136 A ‡ 8/1972 Baumann ............... A61C 5/064
                                                             206/219
3,922,767 A ‡ 12/1975 Solter .................... B21D 28/02
                                                             137/68.26
(Continued)

FOREIGN PATENT DOCUMENTS

DE         2658225      ‡ 6/1978
GB         2028426      ‡ 3/1980

OTHER PUBLICATIONS

Singh, Mrityunjay K., Anderson, Patrick D., Meijer, Han E. H., Understanding and Optimizing the SMX Static Mixer, Macromol. Rapid Commun., 2009, 30, 362-376.‡

*Primary Examiner* — Kevin F Murphy
(74) *Attorney, Agent, or Firm* — Greer, Burns & Crain, Ltd

(57) ABSTRACT

A method for transporting a viscous fluid through a heat exchanger line that includes transporting a viscous fluid through a connecting piece with an excess pressure release component, where the excess pressure relief component separates an interior of the connecting piece from a discharge line in the connecting piece, and is fixed to an edge of the discharge line, mixing a fluid flow in a region of the excess pressure relief component using a mixing element disposed in the interior of the connecting piece and causing the excess pressure release component to release at least a portion of the fluid through the discharge line when the pressure of the fluid is equal to or greater than a preset excess pressure.

10 Claims, 8 Drawing Sheets

(51) Int. Cl.
*F16K 17/02* (2006.01)
*B01F 5/06* (2006.01)

(52) U.S. Cl.
CPC ..... *F28F 2265/12* (2013.01); *Y10T 137/0379* (2015.04); *Y10T 137/1729* (2015.04); *Y10T 137/7837* (2015.04)

(56) References Cited

U.S. PATENT DOCUMENTS

| | | | | |
|---|---|---|---|---|
| 4,046,280 A | ‡ | 9/1977 | Hansen | F16K 17/1613 137/68 |
| 4,246,221 A | * | 1/1981 | McCorsley, III | C08J 3/096 264/203 |
| 4,270,560 A | * | 6/1981 | Kearney | F16K 17/16 116/268 |
| 4,706,698 A | ‡ | 11/1987 | Short, III | F16K 17/16 137/68.19 |
| 4,951,697 A | ‡ | 8/1990 | Fritts | F16K 17/1606 116/266 |
| 4,978,947 A | ‡ | 12/1990 | Finnegan | F16K 17/16 116/266 |
| 5,337,776 A | ‡ | 8/1994 | Perry | F16K 17/162 137/1 |
| 5,762,119 A | ‡ | 6/1998 | Platz | F17C 5/06 141/18 |
| 5,890,504 A | ‡ | 4/1999 | Zikeli | F16K 17/16 137/1 |
| 5,971,603 A | * | 10/1999 | Davis | B01F 5/061 366/337 |
| 6,941,963 B2 | ‡ | 9/2005 | Maula | F16K 7/14 137/1 |
| 7,204,265 B2 | * | 4/2007 | Zikeli | F16L 57/00 137/68.23 |
| 7,841,765 B2 | ‡ | 11/2010 | Keller | B01F 5/0617 366/338 |
| 2002/0075756 A1 | ‡ | 6/2002 | Finder | B01F 5/0498 366/272 |
| 2004/0125691 A1 | ‡ | 7/2004 | Streiff | B01F 5/0616 366/337 |
| 2004/0261850 A1 | ‡ | 12/2004 | Maula | F16K 7/14 137/334 |
| 2005/0051210 A1 | ‡ | 3/2005 | Zikeli | F16L 57/00 137/68.19 |
| 2006/0065992 A1 | ‡ | 3/2006 | Hutchinson | B29C 43/08 264/45.1 |
| 2007/0125425 A1 | ‡ | 6/2007 | Carolan | B01D 53/22 137/71 |
| 2010/0170573 A1 | * | 7/2010 | Draper | B60K 6/12 137/68.23 |
| 2010/0202248 A1 | ‡ | 8/2010 | Hirschberg | B01F 3/10 366/33 |
| 2010/0305883 A1 | ‡ | 12/2010 | Danzy | F16K 17/04 702/50 |
| 2012/0106290 A1 | ‡ | 5/2012 | Meijer | B01F 3/0861 366/337 |
| 2014/0190572 A1 | ‡ | 7/2014 | Zikeli | F28F 7/02 137/12 |
| 2014/0224337 A1 | ‡ | 8/2014 | Zikeli | F16K 17/04 137/1 |
| 2014/0326329 A1 | ‡ | 11/2014 | Zikeli | D01D 1/09 137/340 |

\* cited by examiner
‡ imported from a related application

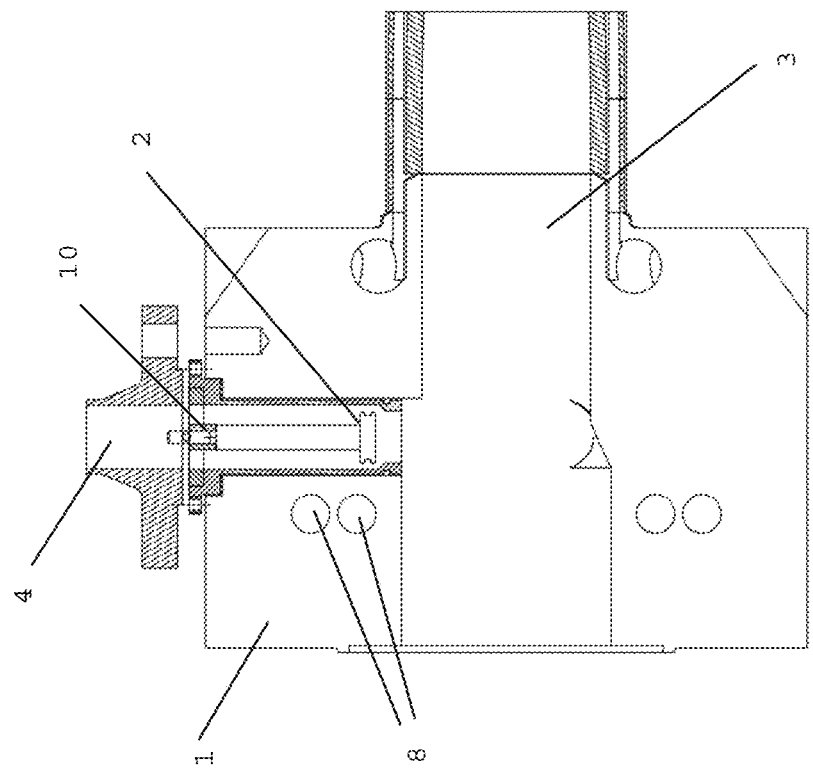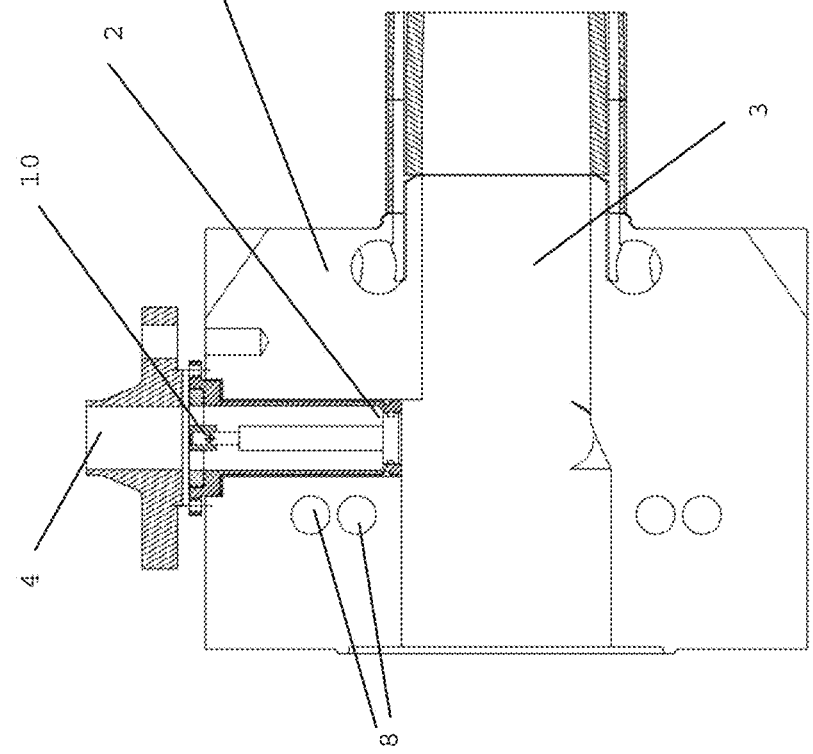

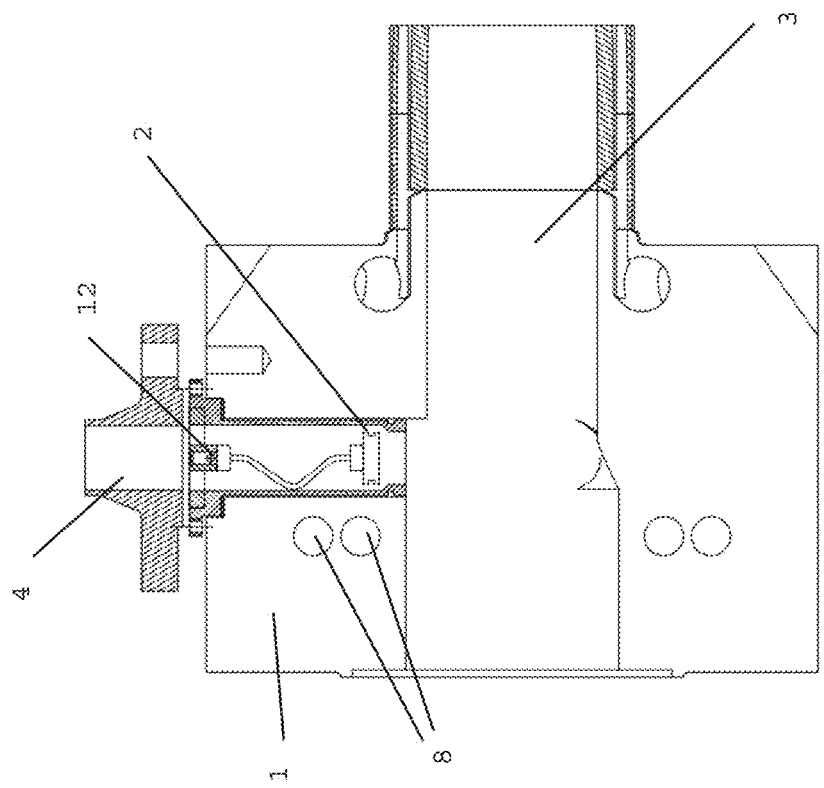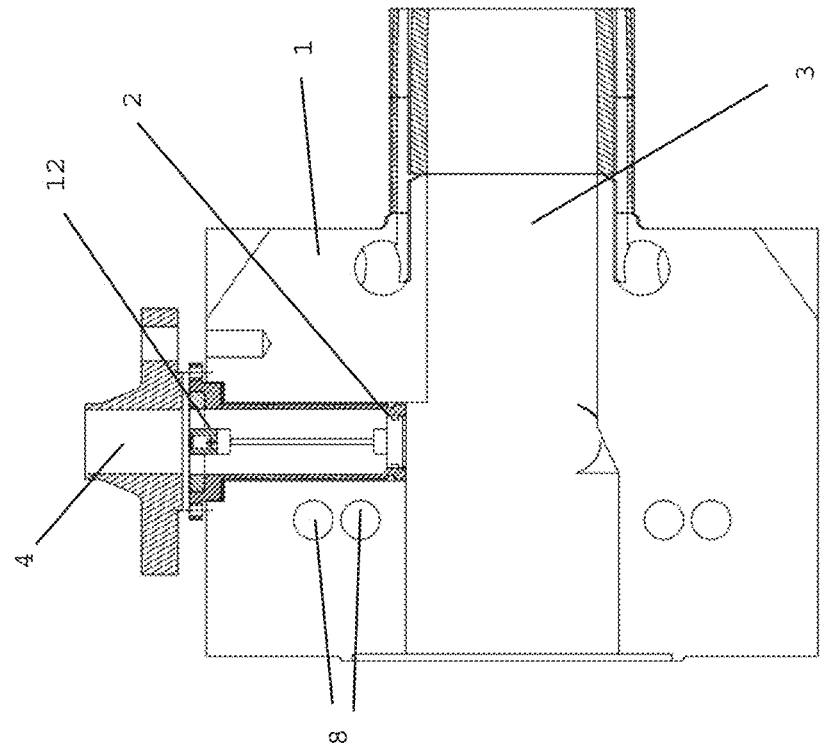

METHOD OF TRANSPORTING A VISCOUS FLUID THROUGH A HEAT EXCHANGER LINE

CROSS-REFERENCE TO RELATED APPLICATIONS

This application is a divisional of and claims priority to U.S. patent application Ser. No. 14/241,640 filed on Feb. 27, 2014, which is the National Stage of and claims priority to International Application No. PCT/EP2012/067086 filed on Sep. 3, 2012, wherein all of these applications are incorporated herein by reference in their entireties.

BACKGROUND

The invention relates to a device and a method for transporting viscous and thermally sensitive fluids through a line comprising heat exchangers, part-lines, connecting pieces, intermediate pieces, deflection pieces, distribution pieces, pumps, filters, etc.

The use of pressure relief devices is generally known. The usual means comprise for example bursting discs comprising a membrane, which burst under the effect of a pressure which is higher than the normal operating pressure, but is lower than the pressure at which a pipe or vessel itself ruptures, as a result of which a pressure relief is enabled with an external space.

Bursting discs are described for example in U.S. Pat. Nos. 6,241,113, 3,845,879, US 2008/0202595, EP 1 591 713 and U.S. Pat. No. 7,870,865. Some bursting discs can comprise perforations in order to ensure bursting-open at a plurality of points or along predetermined rupture points, in order to free the relief cross-section to the maximum.

Bursting discs can be used in the most diverse devices that seek to control the effect of the bursting discs. Thus, U.S. Pat. No. 4,079,854 describes a device which comprises a cutting arrangement with a blade, which tears open a bursting disc after a pressure effect, said bursting disc being concave towards the diversion and convex towards the pressure space.

U.S. Pat. No. 3,872,874 describes a bursting disc device with a convex bursting disc, which is pressed against a cutting spike when expanded due to pressure.

U.S. Pat. No. 4,590,957 relates to a device in which a flat bursting disc is protected against torsion.

EP 1 892 445 describes a bursting disc arrangement, which comprises a plurality of rings which produce a fluid passage under the effect of pressure.

WO 2005/054731 relates to a bursting disc arrangement with a pressure detector.

EP 789 822 relates to a pressure safety device for thermally unstable viscous materials, such as cellulose, water, NMMO (N-methylmorpholine-N-oxide) solutions, in which a bursting element projects into the interior of a transport pipe.

U.S. Pat. No. 4,046,280 A describes a safety element for a pressure vessel. The safety piece comprises a bursting disc, which releases a discharge in the presence of excess pressure and otherwise blocks. Located in the region in front of the bursting disc is a screen of a protective device (engl. "disc protective unit"), which is intended to protect the bursting disc. The protective device is a grid over which a membrane is stretched which prevents rinsing of the disc.

DE 26 58 225 A1 relates to a safety fitting for pipelines and containers with a bursting membrane, which is intended to be supported against the operating pressure by a supporting body perforated sieve-like. For this purpose, the supporting body comprises a plurality of parallel bores in the axial direction, through which a flow passes in the event of a burst. The latter prevent rinsing in the closed sealed state of the disc.

GB 2 028 426 A describes a fitting with a bursting disc. This fitting comprises a bore behind the bursting disc, in the direction of the discharge pipe.

US 2010/305883 A1 describes a valve, in which a temperature sensor is provided in the discharge region.

EP 0 789 822 A1 describes a transport pipe for cellulose-NMMO mixtures with a bursting disc (13), which projects on a support into the pipe.

U.S. Pat. No. 5,337,776 relates to a heat exchanger line with an excess pressure relief device, wherein a bursting disc lies flush in the inside of the wall of the pipe, in order to bring about flushing of the bursting disc with transported liquid. This flushing is intended to prevent the formation of dead spaces in which liquids or other components of the transported liquid are deposited. This aim is also pursued in EP 789 822.

For the transport of viscous and thermally unstable or thermally sensitive materials, in particular those which are kept liquid only by heating and have a tendency towards caking during cooling or lead to deposits, the aim was, for example in EP 789 822 and U.S. Pat. No. 5,327,776, to prevent spaces set back in a pipeline in which these materials could be deposited—referred to as dead spaces. Deposits in front of bursting discs were regarded as a risk for the functioning capacity of the latter, dangerous excess pressures being able to occur.

SUMMARY

According to the invention, it has emerged that the avoidance of dead spaces is not sufficient to protect bursting discs or, in general, excess pressure release components, including valves, against deposits. U.S. Pat. No. 5,337,776 teaches that the bursting disc, installed in a pipeline, should be constituted such that the bursting membrane sits flush in the wall of the pipeline. For this purpose, the pipeline according to U.S. Pat. No. 5,337,776 must be designed and constructed such that the through-going material mass pipe, as well as the thermostat jacket of the pipe, must be interrupted and a heterogeneous thermostat-control zone is present in the pipeline. This unsatisfactory thermostat-control zone (cold points in the course of the pipeline) has an unfavourable effect on the flow behaviour of hot highly viscous and structurally viscous polymer materials (such as cellulose/water/NMMO solutions).

A further substantial drawback of U.S. Pat. No. 5,337,776 lies in the fact that the bursting disc described in the patent specification of necessity has to be welded onto a cylindrical support body. The flush fixing of the bursting disc in the interior of a pipe or in the pipe wall is costly and requires the welding-on of the bursting disc by means of electron beam welding methods. In addition, commercially available bursting discs cannot be used.

It is an aim of the present invention to make available alternative pressure relief devices, which avoid the drawbacks of the previous devices and enable, in a straightforward manner, the use of pressure relief elements such as bursting discs and suchlike.

The invention provides a temperature-regulated connecting piece ("fitting") for transporting a viscous fluid with an excess pressure release component, which separates the interior of the connecting piece from a discharge line. The excess pressure release component can be fixed with an outer edge to the discharge line. The excess pressure release component is provided so as to release a fluid flow in the presence of a preset excess pressure in the connecting piece. A mixing element can be provided in the interior of the connecting piece, said mixing element thoroughly mixing a fluid flow in the region of the excess pressure release component. An excess pressure relief device for transporting a viscous thermally sensitive fluid with an excess pressure release component, which separates the interior of a fluid line, in particular a heat exchanger line, from the discharge line and is fixed to an outer edge of the discharge line, is thus made available. The connecting piece according to the invention is preferably installed in a heat exchanger line, wherein a fluid is transported in a temperature-regulated manner. The transport is brought about in particular by a raised pressure in the region of 1 to 250 bar, wherein the connecting piece according to the invention serves as an excess pressure relief as soon as the pressure exceeds a critical level. The excess pressure release component is selected such that, at normal operating pressure, it separates the discharge line from the interior of the connecting piece in which the fluid is transported and, at a selected pressure, frees the discharge line, so that fluid can escape. The objective invention is further described by the claims.

The connecting piece according to the invention is used in particular for transporting highly viscous and/or thermally unstable fluids, which have to be transported in heat exchanger lines in order to enable a temperature control of the fluid. A temperature control is also implemented in the connecting piece according to the invention.

A previous problem with bursting elements for transporting viscous or temperature-sensitive fluids was the temperature fluctuations caused in the fluid line—even when bursting elements were introduced into externally temperature-regulated heat exchangers, such as described for example in WO094/28213 A1. Inhomogeneities thus arose in the temperature—but also in the viscosity profile of the fluids, which can lead to deposits or excess pressures. According to the invention, the connecting pieces are heat-regulated in order to act on the uniformity of the temperature and viscosity, with at the same time the installation of a bursting element. It has been shown that, as a result of the devices according to the invention, excess pressure release components are not limited merely to bursting elements, but rather other components, such as for example excess pressure valves, can also be used. The temperature regulation can take place by means of thermal insulation of the connecting piece and/or by means of heating or cooling elements (8). In order to keep the fluid at a desired temperature, purely simple thermal insulation may be sufficient if the fluid itself carries the desired heat for the transport, for example generated by friction losses. The connecting element is preferably a solid block of a heat-conducting material with sufficient thermal capacity, so that, with external thermal insulation, a homogeneous heat distribution arises at the inner walls of the connecting piece. In preferred embodiments, heating or cooling elements are provided, e.g. heat carrier lines, which keep the interior at a desired temperature.

A heating element is preferably provided in the region of the excess pressure release component in the connecting piece. By means of such an element, a fluid can be temperature-regulated in the region of the excess pressure release component, as a result of which hardening of solidifiable materials is avoided or the viscosity of the fluid can be lowered and flushing can be brought about either by the flow of the fluid in the heat exchanger line or by the relief bore. By means of heating, it is possible to prevent viscosity differences from arising in the fluid in the region before the excess pressure release component or fluids from being deposited, as a result of which no exothermically reactive regions arise before the excess pressure release component when thermally unstable fluids are used.

The heating element can comprise an electrical heating element, induction coils or heating channels, in which a heating medium can be conveyed. Alternatively, such channels can be used to convey a cooling liquid if the selected fluid is to be cooled in the region of the excess pressure release component.

The temperature regulation of the connecting piece is preferably adjusted such that, in the interior during the transport of a fluid such as cellulose/NMMO/water at 90° C., a temperature difference (temperature spread) of at most 10° C., preferably at most 8° C., at most 6° C., at most 5° C., at most 4° C., at most 3° C., at most 2° C., at most 1° C., in the interior of the connecting piece, occurs at the wall sections, including the excess pressure release component, of the connecting piece.

The connecting piece can comprise a mixing element, such as described for example in U.S. Pat. No. 7,841,765. The invention is not limited to special mixing elements, but rather various mixing elements can be selected, said mixing elements being accommodated in the heat exchanger lines. Use is preferably made of static mixing elements. The mixing element should, in particular, thoroughly mix the fluid flow in the interior of the connecting piece, in particular in the region of the excess pressure release component. Temperature, viscosity and pressure inhomogeneities of the fluid are thus avoided, since the fluid is constantly mixed and homogenised. The frictional heat generated by the mixing elements is conducted away through the temperature regulation of the connecting piece. Standard mixing elements are static mixers, such as described for example in WO 2009/000642, i.e. internally temperature-regulated static mixers. Since, as mentioned above, the highly viscous fluids can cool down in the regions of an excess pressure release component, as a result of which different temperature and viscosity behaviour arises, a different flow behaviour of the fluid in turn results therefrom. According to the invention, therefore, the mixing element is introduced so far into the distribution pieces, i.e. over the region of the excess pressure release component, that a good through-flow is also guaranteed in the region of the excess pressure release component, i.e. in the entire connecting piece.

According to the invention, it has proved to be particularly advantageous that the connecting pieces are designed and the installation of the static mixing elements is carried out in such a way that an active influence on the flow in the region of the excess pressure release component arises or is forced.

The excess pressure release component can be a bursting element having any geometry, preferably a bursting disc, which bursts at a preset pressure and thus frees the discharge line. Fluid can thus be discharged through the discharge line in the presence of excess pressure, so that no damage to the fluid line arises. It is also possible to use excess pressure valves which open at a predetermined pressure. Generally, the excess pressure release component usually comprises a blocking element, e.g. a disc, which blocks the discharge line. This blocking element is shifted, displaced or removed or opened, e.g. by perforation or bursting, in the presence of the predetermined excess pressure, so that an opening to the discharge line arises.

Due to the aforementioned measures according to the invention, use can also be made of commercially available bursting discs as in the undermentioned design examples. The latter are preferably accommodated in a holding fixture and positioned in a section of the heat exchanger line in such a way that the bursting discs are no longer part of a pipe wall, i.e. part of the connecting piece, distribution piece. In particular, the bursting element or the excess pressure release component can generally be set back from the interior of the connecting piece. A region in the interior that is offset from the fluid flow can thus arise. Fluid is preferably conveyed into this space by the mixing element, so that a continuous contact of the excess pressure release component is brought about with the fluid flowing past.

As valves, use may be made of any valves, for example with a blocking element which is held in the blocking position preferably by a spring or a shear fixing or a buckling rod. Under the effect of pressure, the spring, shear fixing or buckling rod gives way, as a result of which the blocking element is displaced and the discharge line is freed. Shear fixings and buckling rods (e.g. from U.S. Pat. No. 4,724,857 or U.S. Pat. No. 5,577,523) bring about irreversible changes during operation, so that the discharge line remains open when there is a following drop in pressure. A spring-loaded valve is able to close again when there is a drop in pressure. In the case of a shear fixing, a linkage, which is connected to the blocking element, is fixed in position by frictional resistance. An excess pressure is able to overcome the frictional resistance and displace the blocking element with the linkage. In the case of a buckling rod, a linkage is selected which is bent under the effect of pressure (flexural buckling) and, according to the Euler's formula for flexural buckling, permits a displacement of the blocking element connected to the linkage.

The connecting pieces can be incorporated by means of various types of connection in a fluid line, in particular a heat exchanger line, such as for example by means of flange joints, clamping joints, threaded joints, weld joints, so that the bond between the heat exchanger line, i.e. the sections of the line, can be produced. The connecting pieces can be produced from suitable special steels, normal steels, highly alloyed chemically resistant steels, other metals and metal alloys, as well as high-strength plastics which are process-resistant (i.e. chemically resistant, temperature resistance and pressure resistant). It is left to the discretion of the person skilled in the art to design these connecting pieces with regard to temperature and pressure and to have the latter incorporated into the design and production.

Use is preferably made of a bursting element which bursts open over a large area at a predetermined excess pressure in order to ensure ample fluid exit. As mentioned at the outset, there are bursting elements, in particular bursting discs, which, through the provision of appropriate features, comprise predetermined rupture points in order to enable bursting open in a controlled manner over a large area. According to the invention, all known bursting elements can easily be fixed in the device, since the bursting elements are not affected by processes having an adverse effect, such as heating by welding. In particular, the bursting element is fixed by the lateral boundary. The present invention enables straightforward fixing of the bursting element. Thus, for example, the bursting element can be fixed, e.g. clamped, preferably flange-mounted, in a holding fixture in the inner wall of the discharge line. The bursting element can also be inserted into the wall of the discharge line in the form of a partial bore (FIG. 3a) as a wall component. A fixing element, for example a flange or clamping flange, can be accommodated in the discharge pipe for the purpose of fixing the bursting element.

It has been found according to the invention that, when use is made of bursting elements which burst over a large area, no drawbacks arise due to dead spaces during the transport of viscose thermally sensitive fluids. Deposits are easily flushed out with the fluid when an excess pressure and bursting of the bursting element occurs. In preferred embodiments, use is made of bursting elements which burst open up to approx. 70% of their area facing the interior of the connecting piece, i.e. of the exposed area between the hollow spaces separated by the bursting disc. In further or particularly preferred embodiments, the disc bursts up to at least approx. 20%, 30%, 40%, 50%, 55%, 60%, 65%, 70%, 72%, 74%, 76%, 78%, 80%, 82%, 84%, 86%, 88%, 90%, 92%, 94%, 96%, 98% or up to 100%, i.e. the total area blocked by the bursting disc can be freed in the presence of excess pressure.

Apart from the use of (any) bursting elements, it is also possible according to the invention to make use of valves or, in general, excess pressure release components. The excess pressure release components, including valves, can be fixed in a holding fixture in the inner wall of the discharge line. The excess pressure release components or their blocking elements can be suitably dimensioned for the applications intended in each case. Preferably, they can free at least approx. 20%, 30%, 40%, 50%, 55%, 60%, 65%, 70%, 72%, 74%, 76%, 78%, 80%, 82%, 84%, 86%, 88%, 90%, 92%, 94%, 96%, 98% or up to 100% of their area facing the interior of the connecting piece in the presence of excess pressure. The excess pressure release components or their blocking elements can be constituted flush or set back with respect to the inner wall of the line in the interior of the connecting piece. The flush embodiment is particularly advantageous in the case of valves, since complete freedom from dead spaces is possible, even in the region of less than 1 mm, which is technically difficult to design for the fixing of bursting elements. The shape of the bursting elements of the valves is therefore preferably matched flush with the inner wall of the connecting piece, so that dead spaces do not arise.

The cross-section of the discharge line and/or the separating area of the bursting element preferably corresponds to at least 20%, at least 25%, at least 30%, at least 35%, at least 40%, at least 50%, at least 55%, at least 60%, at least 65%, at least 70%, at least 75% or at least 80% compared to the cross-section of the fluid line of the interior of the connecting piece.

In further embodiments, a cutting element, e.g. a (bursting) spike or a blade, can be positioned in the discharge line in such a way that, in the presence of excess pressure in the connecting piece, the bursting element is pressed against the bursting spike or the blade and thus bursts open. This permits the use of particularly simple and favourable bursting elements—without their own features for bursting open over a large area, such as predetermined rupture points. By means of a spike or a blade against which the bursting disc is pressed in the presence of excess pressure, even the simplest bursting discs are able to burst open over a large area. Depending on the pressure that becomes established during the transport of viscous fluids, one may speak of "bursting open" by means of these, in themselves, simple means.

The bursting element is preferably a bursting disc. Further bursting elements can be constituted round, elliptical, circular, square or polygonal (in particular a regular polygon).

As a rule, it involves flat discs. Simple bursting elements can easily be punched out of a sheet metal.

The bursting element can be flat or curved. In special embodiments, the bursting element is curved centrally towards the interior of the connecting piece or the facing area, i.e. concave or convex in the direction of the interior of the connecting piece. The curvature can be increased by the (excess) pressure, which leads to bursting or to pressing against a bursting spike or a blade. In preferable embodiments, the blade is provided in the form of a blade cross. In the case of the convex curvatures, the curvature can be reversed by the exertion of pressure and cause stresses in the bursting element which bring about bursting.

A bore is preferably provided between the excess pressure release component and the interior of the connecting piece. This bore can be used for the controlled pressure relief of the interior space or for temperature or pressure control. The connection according to the invention, a distribution piece, can be provided with corresponding bores, in order that pressure and temperature can be inspected, controlled and monitored. For the conveying of highly sensitive polymer materials (e.g. cellulose solutions comprising cellulose, amine oxide and water), it has also proved to be advantageous according to the invention for an additional bore also to be provided in this connecting piece, in order that the quality of the polymer material can be controlled, starting from the preparation of the solution up to the processing section by section with regard to the quality of the spinning compound in respect of the solution viscosity and spinning compound composition and the decomposition behaviour. The bore can therefore be a sampling bore. It is thus not necessary to incorporate a sampling point directly in the fluid line. If a sampling point is provided, a specially designed sampling valve can be constituted in such a way that no residual material is present in the sampling channel after the sample is taken, since said residual material is forced back into the main flow.

In special embodiments, this bore is provided directly before the excess pressure release component. The bore can be used to carry away deposited viscous fluids before the excess pressure release component, e.g. for sampling, or to measure its temperature or pressure. In preferred embodiments, therefore, the bore comprises a temperature and/or pressure sensor. The temperature or pressure sensors can be used in order that fluid is drained through the bore in the case of deviations from a setpoint temperature or a setpoint pressure. This drainage can be carried out continuously or sporadically. For this purpose, the release bore preferably comprises a closable valve.

The connecting piece according to the invention can preferably be made available in the form of a connecting element, for the connection of pipes, in particular in the form of a completely assembled solid block. The connecting piece can be used in an apparatus connection, e.g. of reactors, pumps, pressure vessels, filters, heat exchanger lines, heat exchangers, and/or extruders.

The excess pressure release component, e.g. the bursting element or the valve, can be produced from various materials, such as steel, special steel, ceramic, sintering metals, aluminium, plastic, nonferrous metals or precious metals. Preferred materials are all irons, iron alloys, chromium-nickel steels, nickel steels (e.g. Hastelloy materials), titanium, tantalum, silicon carbide, glass, ceramic, gold, platinum and also plastics. Special materials are alloys with a high molybdenum content, or nickel, chromium and molybdenum alloys for resistance to pitting and crevice corrosion or nickel-copper alloys with a high tensile strength. Material examples are Hastelloy C (high corrosion resistance), Hastelloy B (precipitation-hardening high-temperature alloy), Inconel (resistance to stress corrosion cracks in petrochemical applications), Incoloy (high strength as well as resistance to high temperatures and in respect of oxidation and carburisation), Monel (high tensile strength, resistance to corrosion).

In preferred embodiments, the excess pressure release component is provided for the transport of fluids through the connecting element at high pressures of at least 40 bar to 1000 bar, preferably at least 50 bar, at least 70 bar, at least 100 bar, at least 200 bar, at least 300 bar, at least 400 bar, at least 500 bar, at least 600 bar, at least 700 bar, at least 800 bar, e.g. by selecting suitable materials or material thicknesses and dimensions. In further embodiments, the excess pressure release component is provided for the transport of fluids through the connecting element at high pressures up to at most 1000 bar, preferably up to 60 bar, up to 80 bar, up to 120 bar, up to 250 bar, up to 350 bar, up to 450 bar, up to 550 bar, up to 650 bar, up to 750 bar, up to 900 bar.

The present invention further provides a method for transporting a viscous fluid through the connecting piece, to which a connecting piece or an excess pressure relief device with an excess pressure release component according to the invention is assigned. The invention relates to the use of the connecting piece according to the invention or the excess pressure relief device according to the invention in a heat exchanger line, in particular for or during the transport of a viscous fluid through the heat exchanger line. The connecting element can for example be provided between individual components of a heat exchanger line for the transport of a viscous fluid. Thus, the invention also relates to a method for transporting a viscous fluid through a heat exchanger line which comprises a connecting piece, wherein the connecting piece comprises an excess pressure release component, which separates two hollow spaces of the excess pressure relief device, wherein one hollow space is connected to the interior of the connecting piece or the heat exchanger line, wherein the excess pressure release component frees an opening when there is an excess pressure in the interior, so that a fluid flow between the hollow spaces of the excess pressure relief device occurs.

The viscous fluid is preferably thermally unstable. Thermally unstable fluids are for example cellulose solutions, such as cellulose amine oxide solutions, especially solutions of tertiary amine oxide and water. Such solutions can contain, apart from stabilisers, such as for example gallic acid propylester, organic or inorganic bases, such as for example soda lye. Furthermore, such cellulose/amine oxide and water solutions can also contain product-changing additives, so-called incorporation agents. Cellulose solutions, produced in the amine oxide system, are characterised in that they crystallise when cooled, but can be melted at a temperature of approx. 72-75° C. An example is a cellulose-NMMO solution as described in EP 789 822. The fluid can be an aqueous amine oxide solution with differing concentrations. Thermally unstable fluids are those with which there is a risk of an increase in temperature during the transport through the connecting piece or the heat exchanger line. Temperature increases can occur for example due to exothermic reactions, in particular chemical reactions, or due to the heat of friction during the transport of highly viscous fluids. Further fluids are in particular solidifiable fluids, in particular "hot melts", such as polymers, polycarbonates, polyesters, polyamides, polylactic acid, polypropylene, etc. The fluid can be a thixotropic fluid, in particular a spinning solution. Special fluids have a melting temperature of at least approx. 40° C., at least 50° C., at least 55° C., at least 60° C., at least 65° C., at least 70° C., at least 75° C. The fluid can be conveyed at exemplary temperatures of at least approx. 40° C., at least 50° C., at least 55° C., at least 60° C., at least 65° C., at least 70° C., at least 75° C., at least approx. 80° C., at least 85° C., at least 90° C., at least 95° C. The connecting piece is designed for the transport of these fluids above the melting temperatures—e.g. according to selected temperature-regulating means. The zero shear viscosity of the fluid is preferably in the range from 100 to 15,000 Pas, in particular between 500 and 10,000 Pas.

The excess pressure release component or the blocking element or the bursting element is preferably dimensioned according to the intended fluid flows (or pressures). The area of the excess pressure release component or the blocking element or the bursting element is preferably between 0.01 and 0.4 mm$^2$ per kg of the transported fluid, in particular between 0.02 and 0.3 mm$^2$ per kg.

The present invention is illustrated further by the following figures and examples, without being limited to these special embodiments of the invention.

BRIEF DESCRIPTION OF THE DRAWINGS

FIG. 3 shows various bursting elements, i.e. a bursting disc (a) turned by drilling from a wall block, a concave bursting disc, which bursts with increased forced bulging (b), and a bursting disc with a rupture blade (b). Bursting discs b) and c) are fixed to the edge by clamping in.

FIGS. 5 to 7 show cross-sections through connecting pieces 1 according to the invention with different valves with blocking discs 2 in a closed (FIG. 5a, 6a, 7a) and opened (FIG. 5a, 6a, 7a) position. Fluid line 3 and discharge line 4 and discharge lines 8 are also represented. Blocking disc 2 is connected to a linkage 9, which is fixed by means of a shear ring 10 (FIG. 5) or a spring 11 (FIG. 6) or a holding fixture 12 (FIG. 7), the latter in the buckling rod embodiment, wherein a displacement occurs under the effect of excess pressure.

DETAILED DESCRIPTION

Example 1

Figure 1:
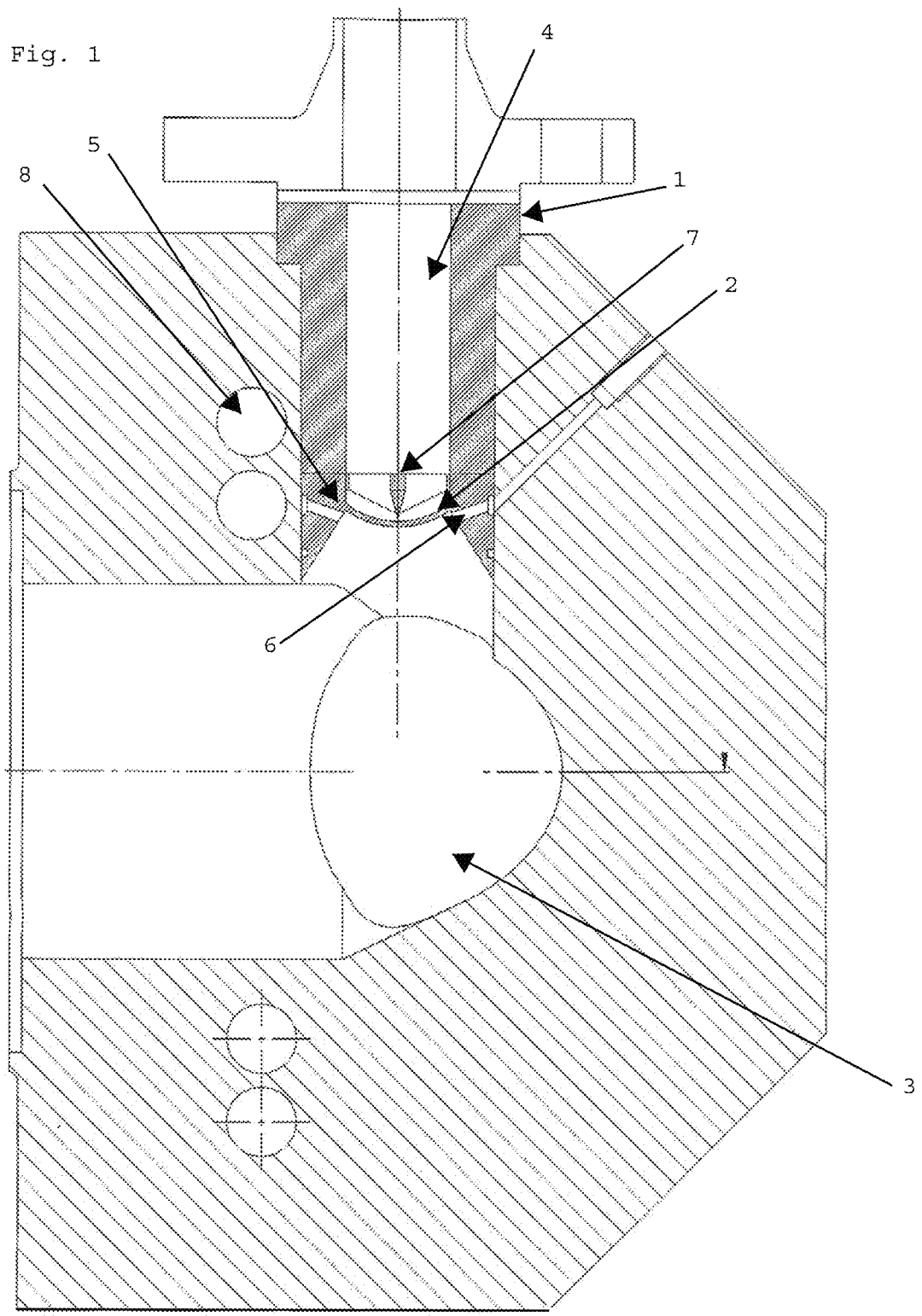
FIGS. 1 and 2 show cross-sections through connecting pieces 1 according to the invention with a bursting element in the form of a bursting disc 2 with assigned fluid line 3 leading past, which here is provided curved leading out of the plane of representation, a discharge line 4, to the edge 5 of which the bursting disc is fixed, a bore 6, a bursting spike 7 and a heating line 8.
Figure 2:
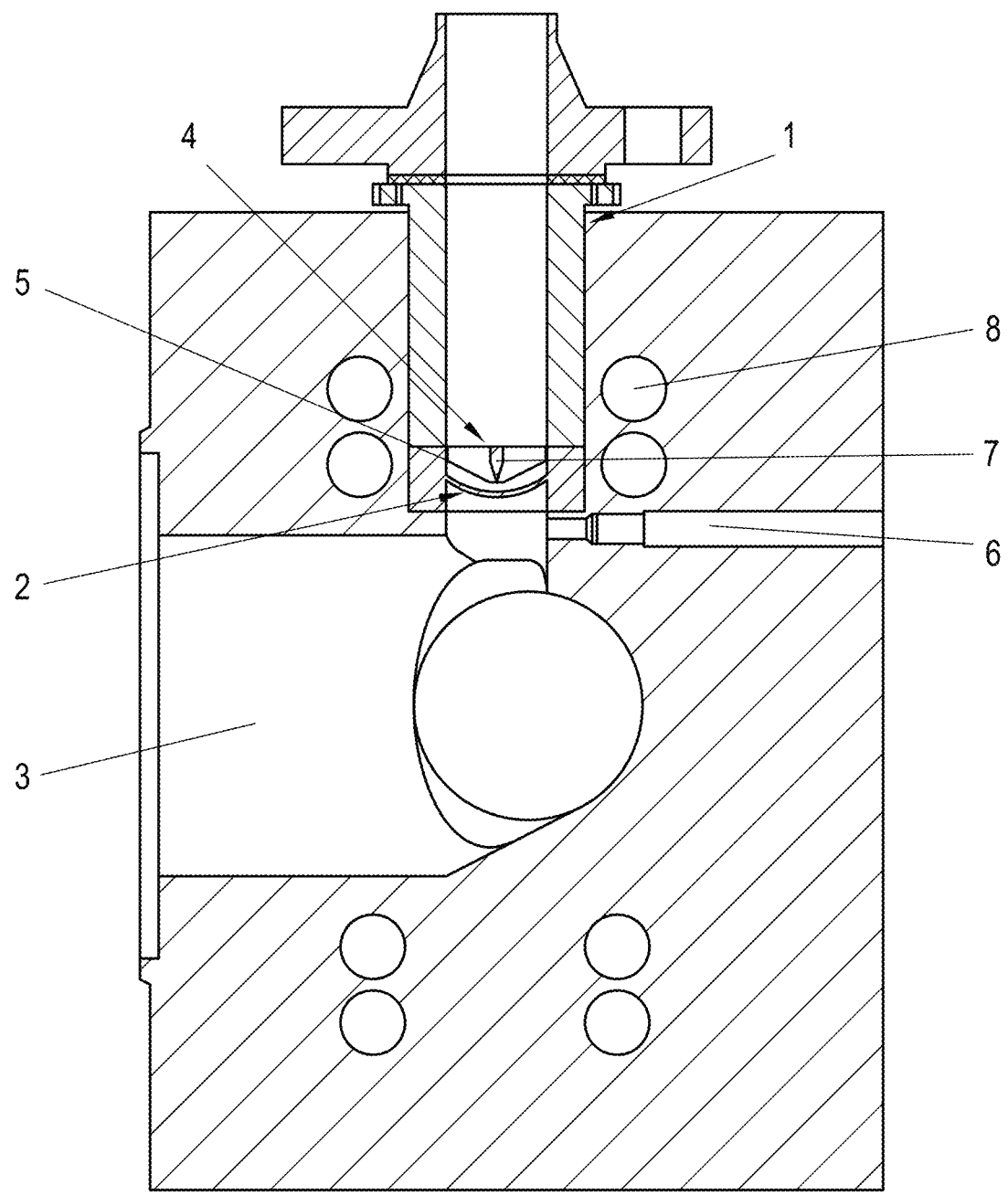
Figure 3A:
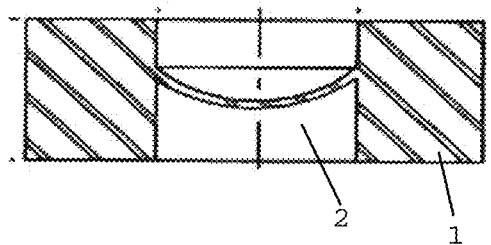
Figure 3B:
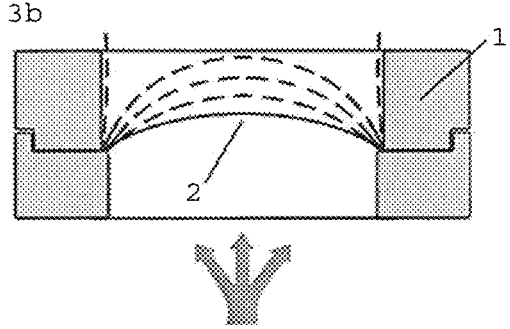
Figure 3C:
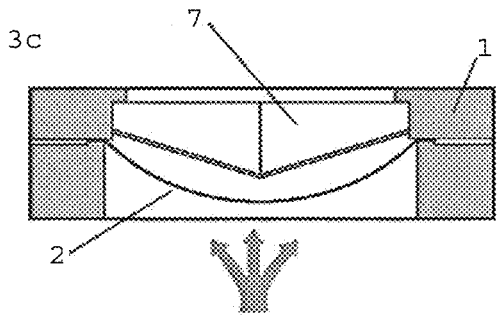
Figure 4A:
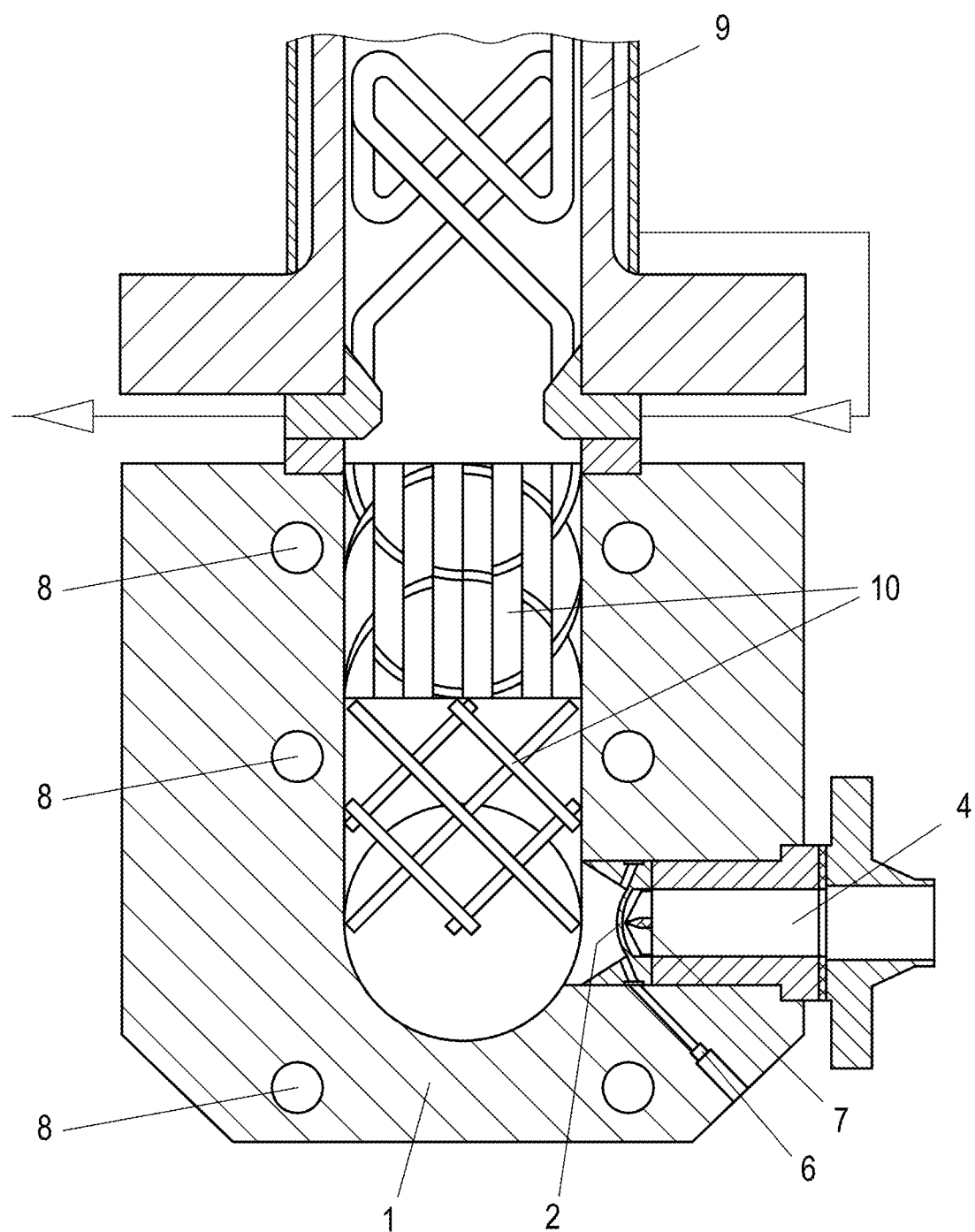
FIG. 4 shows two cross-sections a) and b), with a connecting piece 1 according to the invention which connects two heat exchangers 9, also with mixing elements 10, according to WO 2009/000642.
Figure 4B:
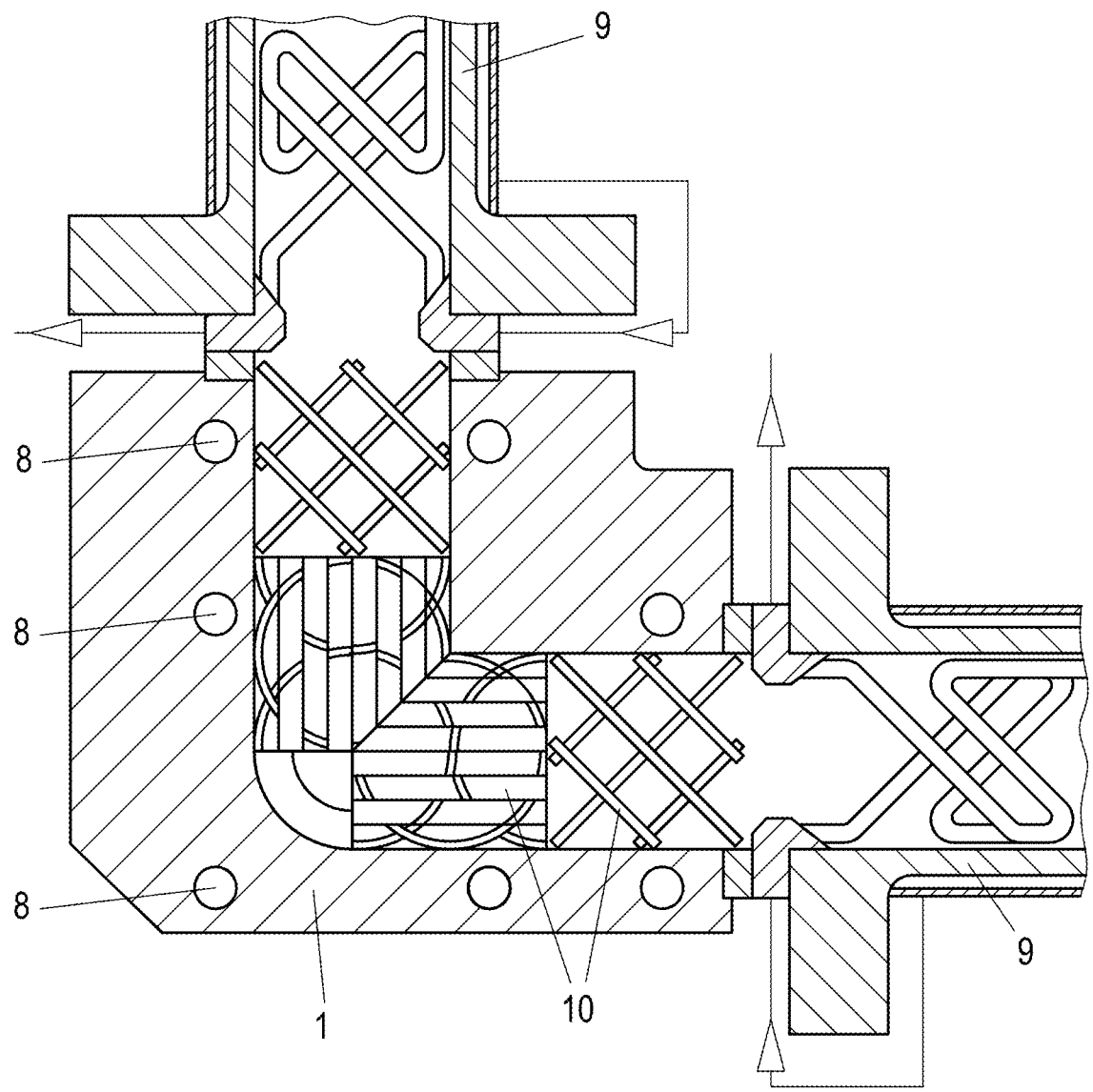
Figure 6A:
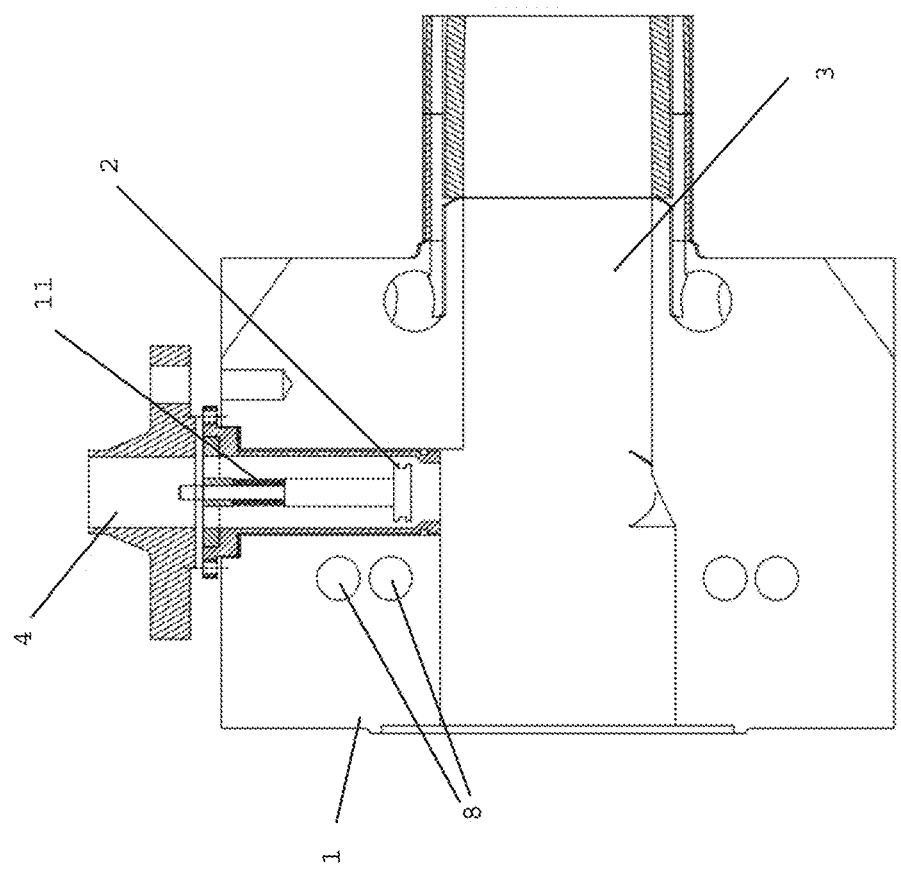
Figure 6B:
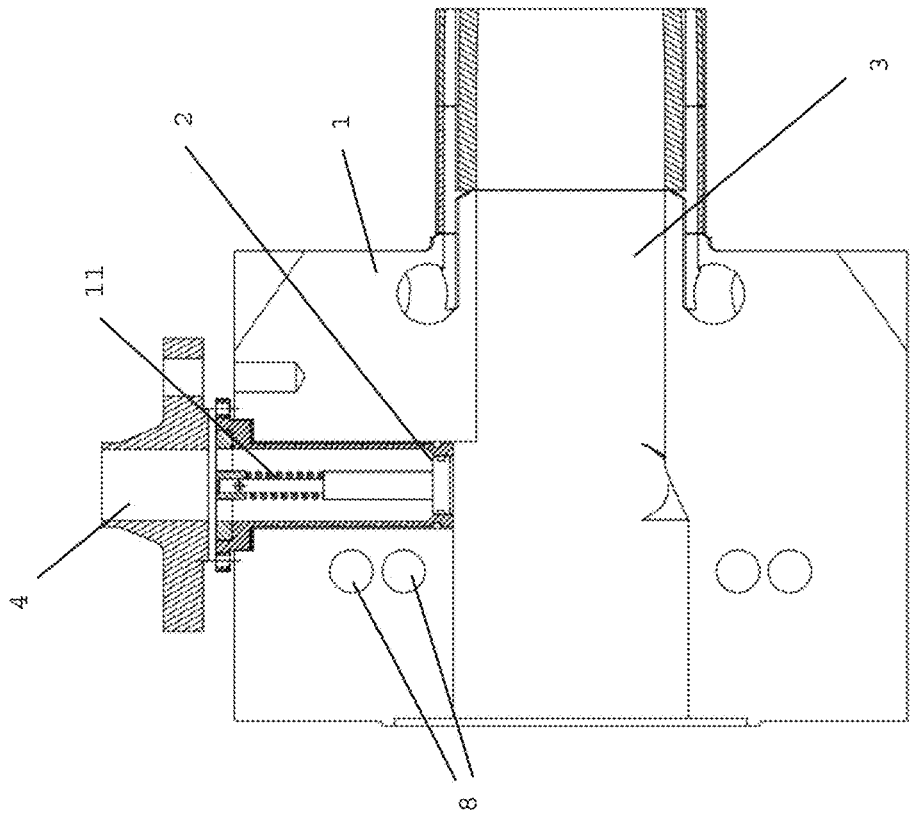

A connecting piece, as represented in FIG. 4, is used according to this example.

In this form, two heat exchanger lines (each 3 m long) are connected by the connecting piece. A discharge line 4 is provided leading away from the connecting piece, said discharge line not lying in the regular flow path of the fluid conveyed through the heat exchanger lines, but being in contact therewith. A bursting disc 2 prevents the discharge during normal operation. In the presence of a critical excess pressure, it is pressed against cutting blade cross 7 and thereby bursts, as a result of which the discharge line is released for the discharge of the fluid. At regular intervals, the pressure and the temperature are checked by sensors before the bursting disc and samples of the fluid are taken through relief bore 6. A mixing element brings about a temperature, viscosity and pressure equalisation of the fluid. The inner diameter of the heat exchangers and of the connecting piece amounts to 108 mm.

During operation, this element was tested with a cellulose-NMMO-water solution (cellulose: 12.9%, NMMO 76.3%, water 10.8%, all % in wt.-%) at a temperature of 90° C. and a pressure of 30 bar. The solution was introduced under pressure into the first heat exchanger by means of a pump. A filter was located at the end of the second heat exchanger in order to maintain the pressure in the line.

No irregular temperatures and pressures were able to be ascertained on temperature and pressure sensors 6 during the trial operation. The bursting disc burst at a simulated excess pressure of 100 bar, as a result of which the pressure fell below the normal working pressure.

Fluid samples were taken at regular intervals at relief bore 6, examined with regard to their thermal stability by means of DSC analysis and compared with the stability of "fresh" cellulose-NMMO-water solution. Even after a running time of several days, a reduction of the thermal stability of the cellulose-NMMO-water solution in the region of the bursting disc could not be ascertained compared to "fresh" solution.

Example 2

A polymer solution for use as a spinning solution with the following composition was transferred through a heat exchanger line system, comprising heat exchangers and connecting pieces according to the invention as distribution pieces, from spinning solution production to processing of the latter in a spinning machine.

The spinning compound comprising a mixture of celluloses of the type MoDo Crown Dissolving-DP 510-550 and Sappi Saiccor DP 560-580 was continuously produced in the following composition: cellulose 12.9%; amine oxide (NMMO—N-methyl-morpholine-N-oxide) 76.3%; water 10.8%.

The preparation of the solution took place, after an aqueous enzymatic pre-treatment and preparation of a suspension had been carried out, by evaporation of excess water under vacuum in a reaction vessel at a temperature of 97 to 103° C., through which a continuous flow was passed. Known stabilisers were added to stabilise the solvent NMMO/water. The stabilisation of the cellulose solution took place in a known manner with gallic acid propylester. For the safety-orientated preparation of the solution, the heavy metal ion content was controlled and a value of 10 ppm as a sum parameter (of metal ions and nonferrous metal ions) was not exceeded.

The density of the prepared solution amounts to 1200 kg/m$^3$ at room temperature. The zero shear viscosity of the spinning compound adjusted by the cellulose material mixing components can, measured at 75° C., amount to up to 15,000 Pas. Depending on the processing temperature selected in the spinning process, the zero shear viscosity can vary in the range from 500 to 15,000 Pas. Due to the structurally viscous behaviour of the spinning solution, the viscosity falls at spinning shear rates, depending on the selected processing temperature, to a range of below 100 Pas and is also very dependent on the cellulose concentration in the spinning solution.

For the purpose of temperature measurement and viscosity measurement, polymer material was sampled on the connecting pieces at the sampling openings during the passage, the bursting disc provided in the connecting piece being dimensioned for a specific throughput per mm$^2$ of bursting area.

| Sampling opening via distribution piece | Spec. bursting disc dimensioning kg polymer material/ mm2 bursting disc area | Temp. ° C. | Temp. deviation ± in ° C. | Viscosity ço in Pas at 90° C. | Viscosity deviation ço in Pas at 90° C. ± |
| --- | --- | --- | --- | --- | --- |
| Reactor | 0.11 | 101.5 | 2.4 | 1270 | 98 |
| After heat exchanger | 0.08 | 96.5 | 0.8 | 2080 | 85 |
| After filter | 0.05 | 97.3 | 1.3 | 1550 | 73 |
| After pump - distribution | 0.15 | 95.8 | 0.9 | 2200 | 67 |
| Distribution - spinning machine | 0.04 | 91.5 | 1.1 | 3650 | 54 |

Deviations in respect of temperature and viscosity were ascertained by 10 individual measurements and by taking the average value.

While particular embodiments of the present method are shown and described, it will be appreciated by those skilled in the art that changes and modifications may be made thereto without departing from the invention in its broader aspects and as set forth in the following claims.

What is claimed is:

1. A method for transporting a viscous fluid through a heat exchanger line, the method comprising:

transporting a viscous fluid through a connecting piece with an excess pressure release component, wherein the connecting piece defines a discharge line in communication with the heat exchanger line, and said excess pressure relief component is fixed within the discharge line, said excess pressure relief component has an axial inner end and is spaced a distance from an axial inner end of the discharge line;

mixing a fluid flow in a region of the excess pressure relief component using a single mixing component including at least six mixing elements disposed in an interior of the connecting piece, wherein at least two of said six mixing elements cross each other; and causing the excess pressure release component to release at least a portion of the fluid through the discharge line when the pressure of the fluid is equal to or greater than a preset excess pressure.

2. The method of claim 1, wherein a zero shear viscosity of the fluid is 100 to 15,000 Pas.

3. The method according to claim 1, wherein the viscous fluid is thermally unstable.

4. The method according to claim 1, wherein the viscous fluid is a cellulose solution.

5. The method according to claim 1, further comprising positioning said single mixing component adjacent to an opening to said connecting piece.

6. A method for transporting a viscous fluid through a heat exchanger line, the method comprising:

transporting a viscous fluid through a connecting piece with an excess pressure release component and defining a discharge line in communication with the heat exchanger line, wherein the excess pressure relief component separates the discharge line in the connecting piece, and is fixed within the discharge line, said excess pressure relief component has an axial inner end that is spaced a distance from an axial inner end of the discharge line;

mixing a fluid flow in a region of the excess pressure relief component using a single mixing component including a plurality of criss-crossing mixing elements disposed in the interior of the connecting piece; and causing the excess pressure release component to release at least a portion of the fluid through the discharge line when the pressure of the fluid is equal to or greater than a preset excess pressure.

7. The method of claim 6, wherein a zero shear viscosity of the fluid is 100 to 15,000 Pas.

8. The method according to claim 6, wherein the viscous fluid is thermally unstable.

9. The method according to claim 6, wherein the viscous fluid is a cellulose solution.

10. The method according to claim 6, further comprising positioning said single mixing component adjacent to an opening to said connecting piece.

* * * * *